United States Patent [19]
Hassinger et al.

[11] Patent Number: 5,477,829
[45] Date of Patent: Dec. 26, 1995

[54] AUTOMOTIVE RETURNLESS FUEL SYSTEM PRESSURE VALVE

[75] Inventors: Christian V. Hassinger; Stephen T. Kempfer, both of Canton; Matthew L. Stein, Ypsilanti; Randall A. Betki, Grosse Ile, all of Mich.

[73] Assignee: Ford Motor Company, Dearborn, Mich.

[21] Appl. No.: 287,034

[22] Filed: Aug. 8, 1994

[51] Int. Cl.⁶ .............................. F02M 41/00; F16K 17/26
[52] U.S. Cl. .......................... 123/467; 137/493.8; 123/510
[58] Field of Search ..................... 123/467, 506, 123/510; 137/512, 512.1, 539.5, 493.8

[56] References Cited

U.S. PATENT DOCUMENTS

| | | |
|---|---|---|
| 2,297,129 | 9/1942 | Bohnstedt . |
| 2,351,874 | 6/1944 | Parker ............... 137/493.8 |
| 2,737,167 | 10/1952 | Dickey . |
| 2,881,747 | 4/1959 | Gehner . |
| 2,915,335 | 10/1965 | Shanklin ............... 137/493.8 |
| 3,695,376 | 10/1972 | Fiedler ............... 137/493.8 |
| 3,742,926 | 7/1973 | Kemp ............... 123/467 |
| 3,769,952 | 11/1973 | Fiedler ............... 137/493.8 |
| 3,913,601 | 10/1975 | Hanson ............... 137/493.8 |
| 4,648,369 | 3/1987 | Wannenwetsch . |
| 4,709,680 | 12/1987 | Turchi ............... 123/467 |
| 4,923,602 | 5/1990 | Blood ............... 137/493.8 |
| 4,989,590 | 2/1991 | Baum ............... 137/493.8 |
| 5,265,644 | 11/1993 | Tuckey . |
| 5,339,785 | 8/1994 | Wilksch ............... 123/467 |
| 5,361,742 | 11/1994 | Briggs et al. . |
| 5,365,906 | 11/1994 | Deweerdt ............... 123/467 |

FOREIGN PATENT DOCUMENTS

| | | | |
|---|---|---|---|
| 835969 | 4/1952 | Germany | 137/493.8 |
| 178320 | 10/1935 | Switzerland | 123/467 |

*Primary Examiner*—Carl S. Miller
*Attorney, Agent, or Firm*—David B. Kelley; Roger L. May

[57] ABSTRACT

A fuel delivery system for a fuel injected automotive internal combustion engine has a fuel pump mounted within a fuel tank for pumping fuel through a fuel line to an engine mounted fuel rail which delivers fuel to a plurality of fuel injectors. Attached on the output side of the fuel pump in the fuel line is a pressure valve for controlling fuel flow from the pump to the rail and from the rail to the pump. The pressure valve has a housing for containing a check valve, which opens upon the fuel pump delivering a predetermined pressure to the fuel line, and a pressure relief valve, which opens to allow fuel flow from the fuel line to the output side of the fuel pump when the fuel line is overpressurized. The relief valve has a predetermined set point greater than that of the check valve is mounted in parallel therewith so that pressure in the fuel line is maintained at an appropriate level during long deceleration periods, as well as when the engine is off.

1 Claim, 3 Drawing Sheets

AUTOMOTIVE RETURNLESS FUEL SYSTEM PRESSURE VALVE

FIELD OF THE INVENTION

The present invention relates to fuel line pressure valves, and, more particularly, to a fuel line pressure valve which provides the pressure relief and check valve functions in a parallel path for an automotive internal combustion engine returnless fuel delivery system.

BACKGROUND OF THE INVENTION

Conventional fuel injection systems utilize a fuel pump to provide fuel to a fuel rail which carries fuel to a plurality of fuel injectors. A pressure regulator is mounted in the fuel flow path so as to maintain the fuel pressure in the rail at approximately 40 psi greater than engine intake manifold vacuum. The pump, typically mounted in the fuel tank, runs at a constant speed and may deliver, for example, 90 liters per hour. When idling, the engine needs only about 3 liters per hour and, therefore, 87 liters per hour must be returned to the fuel tank through a return line. This returned fuel usually has an increased temperature as a result of being routed to the engine and thus frequently evaporates upon reaching the relatively lower pressure and temperature of the fuel tank. The fuel vapor so generated either remains in the tank until vented to atmosphere, which potentially creates environmental problems, or until captured in a vapor storage container, such as a carbon canister, which requires additional manufacturing expense.

In any case, the problems associated with fuel vapor generation in conventional fuel systems have led fuel system designers to develop returnless fuel supply systems, such as that disclosed in U.S. Pat. No. 5,237,975 (Betki et al.). In such a system, fuel rail pressure is controlled for precise fuel mass flow to the injectors at both normal elevated engine temperatures by varying fuel pump speed as a function of assorted variables, including fuel temperature, fuel pressure, engine RPM, and fuel injector pulsewidth. Therefore, no fuel is returned to the fuel tank.

During operation of a vehicle employing a returnless fuel delivery system such as that discussed above, the engine typically cycles through periods of acceleration, intermediate speed operation, deceleration, and idle. To accommodate those cycles, fuel pressure in the fuel rail is varied for proper mass flow. However, during long deceleration periods, pressure within the fuel rail may rise above a level at which effective control of mass flow is possible. For example, pressure within the fuel rail may exceed 70 psi due to high engine temperatures, potentially resulting in reduced fuel economy due to the engine running rich. Excessively high fuel temperatures within the fuel rail may also lead to fuel vaporization resulting in degraded performance due to the engine running lean.

An additional fuel rail pressure problem may occur upon engine start-up if the vehicle is exposed to high ambient temperatures after engine shutoff. In such a circumstance, residual engine heat, along with ambient heat, may cause fuel pressure within the fuel rail to rise above a level effectively controllable by the fuel injectors. High fuel rail pressure may result in fuel leakage through the injectors into the intake manifold, which in turn may cause a rich engine start-up and undesirable exhaust emissions.

One solution to the above-noted fuel rail pressure problems is to provide a pressure relief valve in the fuel line to reduce rail pressure when it exceeds a predetermined value. Some fuel systems have a pressure relief valve connected in a "T" fashion to the fuel line downstream of the pump to and return fuel overage directly to the fuel tank, as disclosed in U.S. Pat. No. 2,881,747 (Gehner). One disadvantage of the "T" configuration is that the relief set pressure of the valve must be set well above system operating pressure since the valve is referenced to tank pressure as opposed to pump output pressure. As a result, the range at which pressure within the fuel rail can be controlled is limited. A second disadvantage of the "T" configuration is that a separate by-pass line and associated fittings are required thus increasing the manufacturing cost and assembly required. The "T" configuration also has the disadvantage of returning fuel overage directly to the fuel tank which may result, particularly under high temperature conditions, in the fuel pump continuously pumping fuel through the pressure valve and back into the fuel tank.

Another fuel line pressure valve is disclosed in U.S. Pat. No. 4,648,369 (Wannenwetsch). That valve serves to prevent unintended fuel injections in a diesel engine by relieving fuel line pressure pulsations caused during operation of a piston-type fuel pump. Such a valve would be inappropriate for a returnless fuel system since its intended purpose is to damp out high-frequency pressure pulsations, not to relieve temperature induced fuel rail pressures. In addition, the valve would be exceedingly difficult to manufacture and assemble, and thus too expensive for large scale automotive production.

SUMMARY OF THE INVENTION

An object of the present invention is to provide a pressure valve for a returnless fuel delivery system which appropriately relieves system pressure during times when the engine is running but the fuel injectors are closed for a relatively long period of time, as well as when the engine is off.

Another object is to provide a valve which maintains pressure within the fuel line after engine shut-off so that exhaust emissions are properly controlled during engine restart.

Yet another object of the present invention is to provide a dual function fuel system pressure valve which can be economically manufactured and easily assembled.

An advantage of the present invention is that pressure within the fuel line can be controlled relative to fuel pump output pressure when the engine is off as well as during long deceleration periods, such as on a long, declining stretch of road.

Another advantage is that high pressure fuel is not continuously relieved to the fuel tank under hot operating conditions.

A feature of the present invention is that a single housing contains a check valve and a pressure relief valve in parallel thus eliminating the need for a separate pressure relief line and the concomitant components, while functionally allowing the fuel line pressure to be effectively controlled during engine off as well as when the fuel injectors are closed for a relatively long period of time.

The above objects, advantages and features are achieved by providing a fuel delivery system for an automotive internal combustion engine comprising a fuel tank having a fuel pump therein in fluid communication with the fuel tank and a fuel line on an output side of the pump in fluid communication with a fuel rail connected to the engine. Valve means are interposed in the fuel line between the fuel pump and the fuel rail for controlling fuel flow from the pump to the rail and from said rail to the pump. The valve means comprises a valve housing having a pair of half sections, with each of the half sections having a valve receiving portion and a nipple for attachment to a fluid bearing device, the valve housing having a valve center portion for attachment with the pair of half sections so that the pair of half sections cooperate to form a valve chamber. A check valve is mounted in the valve center portion within the chamber and is operable to allow fuel flow from the pump to the fuel line upon the fuel pump delivering a predetermined fuel pressure to the fuel line. In addition, a pressure relief valve is mounted in the valve center portion within the chamber parallel to the check valve and is operable to allow fuel in the fuel line to flow through the housing to the fuel pump upon fuel pressure in the fuel line exceeding a predetermined relief pressure.

A preferred embodiment has a housing wherein each of the half sections has a recessed, generally figure-eight-shaped valve receiving portion with an orifice through an upper portion thereof in fluid communication with the nipple. The center portion is also shaped as a figure-eight with a top section of the figure-eight retaining the check valve and a bottom section of the figure-eight retaining the pressure relief valve. The half sections are attached with the nipples aligned so that a fuel flow path is formed along an axis through one of the nipples, through the check valve, and through the other of the nipples.

DETAILED DESCRIPTION OF THE PREFERRED EMBODIMENTS

Figure 1:
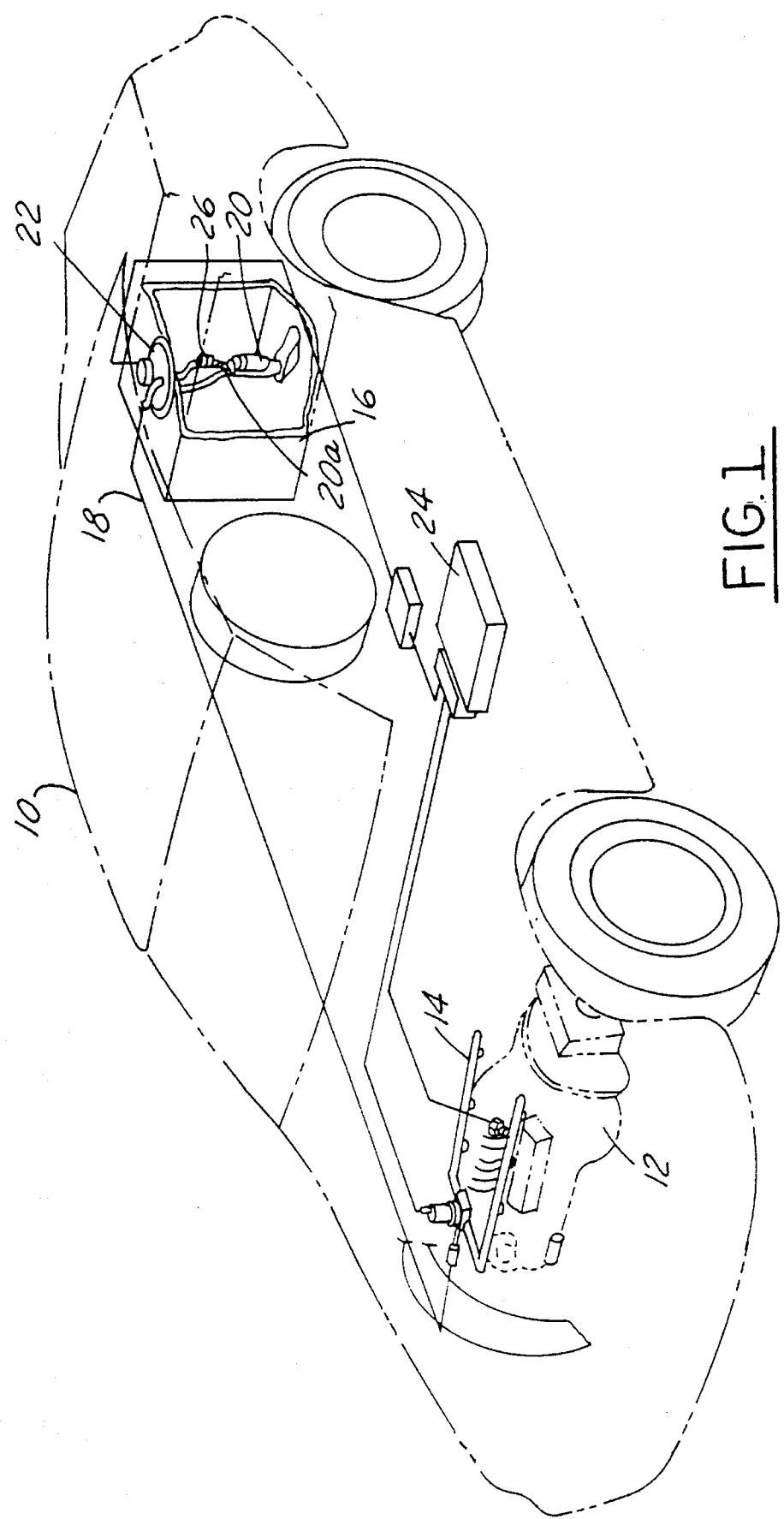
FIG. 1 is a perspective view of an automotive fuel delivery system employing a pressure valve according to the present invention.

Referring now to the drawings, FIG. 1 shows automotive vehicle 10 with internal combustion engine 12 conventionally mounted in a forward section thereof. Those skilled in the art will appreciate that FIG. 1 is a schematic drawing of a fuel delivery system according to the present invention for illustrative purposes only, and is not meant to represent actual vehicle 10 component locations or dimensions. Fuel rail 14 is mounted atop engine 12 for delivery of fuel thereto in a manner known to those skilled in the art. Fuel is delivered to fuel rail 14 from fuel tank 16 through fuel line 18 by the pumping action of fuel pump 20, preferably an electric pump, which is mounted in fuel tank 16 via flange 22 in a well known fashion. Proper mass flow rate to fuel rail 14 is controlled by an electronic engine control (EEC) unit, generally designated 24, which varies fuel pump 20 voltage, and thus speed, in response to several engine operating parameters, including fuel temperature, fuel pressure, engine RPM, and fuel injector pulse width. A returnless fuel delivery control system suitable for the above-described purpose was disclosed in U.S. Pat. No. 5,237,975 (Betki et al.), which is assigned to the assignee of the present invention and which is incorporated herein by reference.

Although EEC 24 can effectively control fuel mass flow rate to engine 12 under most engine operating conditions by varying fuel pump speed, there are certain circumstances, such as when fuel rail pressure becomes excessive, when turning off fuel pump 20 will not prevent excessive fuel injection. Such situations might occur, for example, during long deceleration periods when residual engine heat raises the temperature of fuel within fuel rail 14. In addition, pressure within fuel rail 14 may rise after engine 12 shut-off, particularly in high ambient temperature conditions. If no provision is made to relieve the corresponding fuel pressure increase in fuel rail 14, EEC 24 may not be able to effectively control mass flow rate to engine 12, at least for a period of time while pressure in fuel rail 14 remains relatively high, for example, 70 psi or more. The present invention provides pressure valve 26 (FIG. 1) interposed in fuel line 18 between fuel pump 20 and fuel rail 14 for controlling fuel flow from pump 20 to rail 14 and vice versa. Preferably, pressure valve 26 is mounted within fuel tank 16 near output side 20a of fuel pump 20, as seen in FIG. 1.

Figure 2:
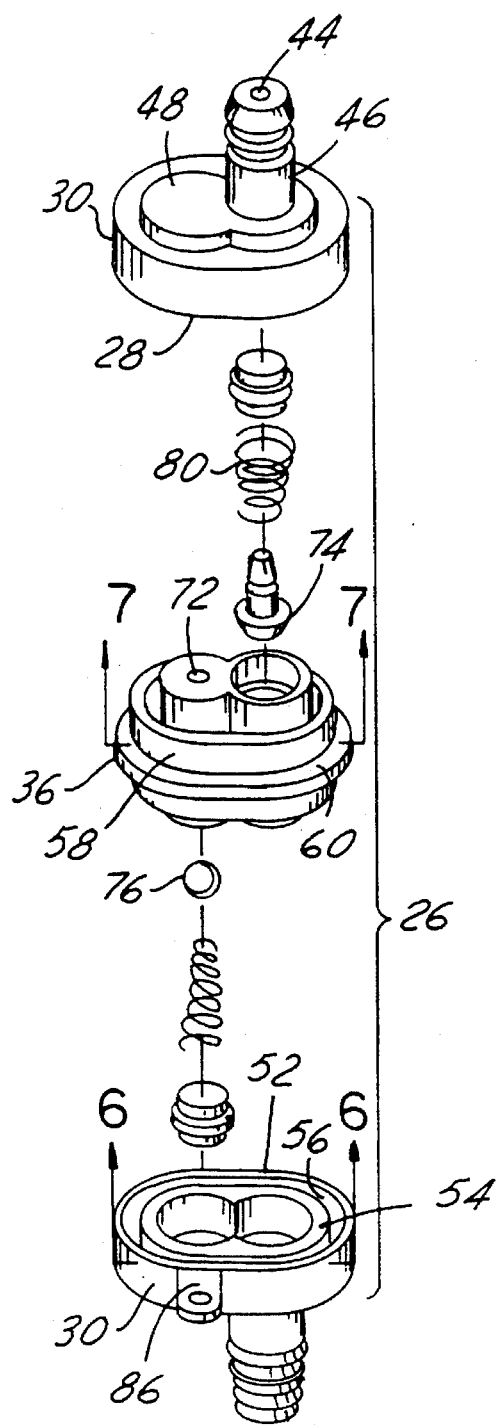
FIG. 2 an is exploded, perspective view of a pressure valve according to the present invention.
Figure 3:
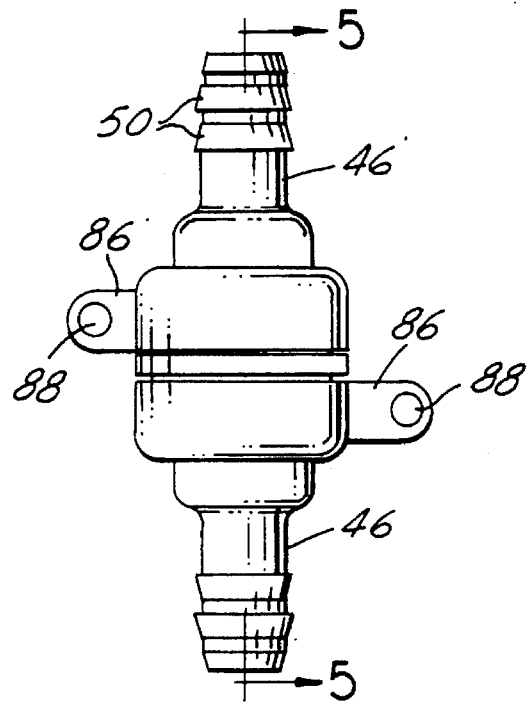
FIG. 3 is a top view of an assembled pressure valve according to the present invention.
Figure 4:
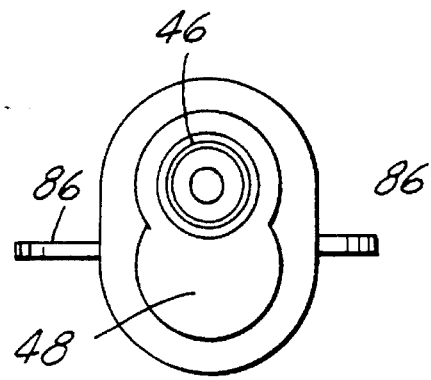
FIG. 4 is an end view of the pressure valve shown in FIG. 3.
Figure 5:
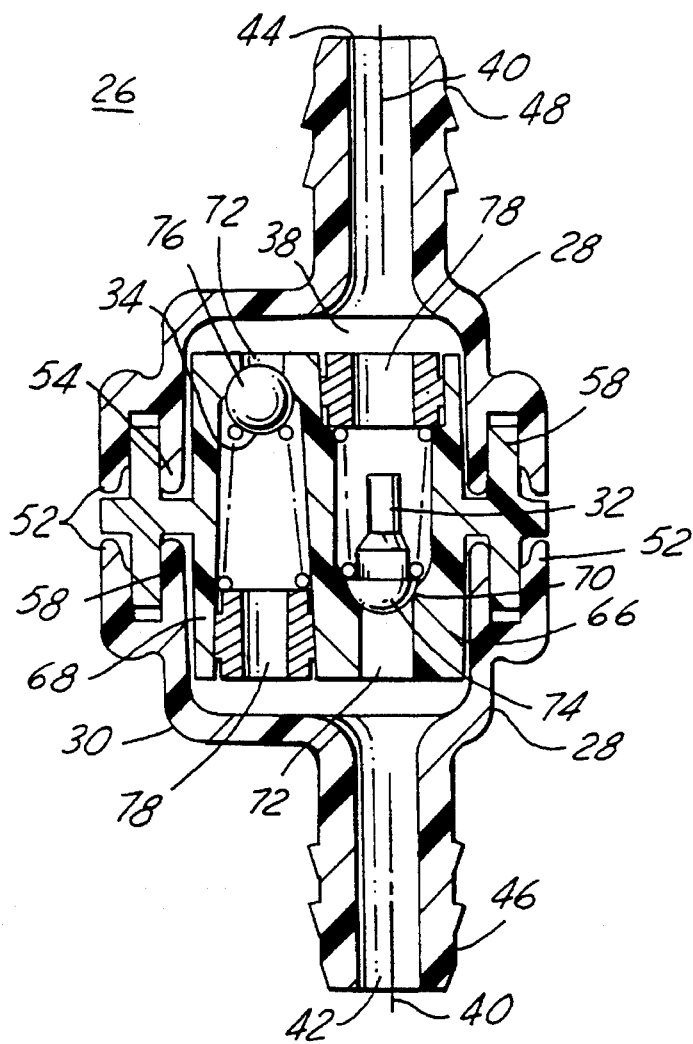
FIG. 5 is a schematic view of a pressure valve according to the present invention taken along line 5—5 of FIG. 3.

FIG. 2 shows pressure valve 26 in an exploded, perspective view. A top view of an assembled pressure valve 26 is shown in FIG. 3, and FIG. 4 shows an end view of the valve of FIG. 3. A schematic view of pressure valve 26 is shown in FIG. 5. Referring now to FIG. 2 and FIG. 5, pressure valve 26 has a pair of generally oblong-shaped half sections 28 which form a housing 30 (FIG. 5) for containing pump check valve 32 and pressure relief valve 34 (FIG. 2 and FIG. 5). Center section 36 serves as a guide for combining half sections 28 as well as a fixture for mounting check valve 32 and pressure relief valve 34 in parallel with respect to axis 40 through inlet 42 and outlet 44, within chamber 38 of housing 30 (FIG. 5). It is important that check valve 32 and relief valve 34 be situated in parallel so that fuel flow from pump 20 to rail 14 can be controlled, and, more importantly, that fuel flow from rail 14 to pump 20 can be controlled to relieve fuel line 18 pressure under certain engine cycles, such as long deceleration periods, as discussed above.

Each half section 28 has a nipple, or tubular connector 46, which extends from figure-eight shaped portion 48 on housing 30 (FIG. 2 and FIG. 3) for connection with a fluid bearing device, such as fuel line 18 or fuel pump output side 20a. Preferably, connector 46 has annular fir-tree shaped barbs 50 which provide a firm fit between connector 46 and, for example, a portion of fuel line 18 within fuel tank 16.

Figure 6:
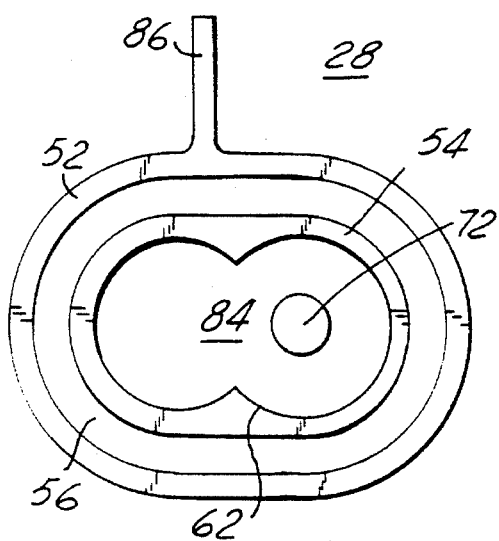
FIG. 6 is an inside view of a pressure valve housing half section of the present invention taken along line 6—6 of FIG. 2.
Figure 7:
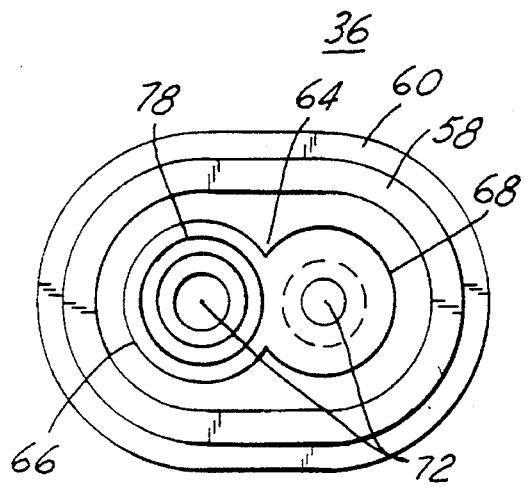
FIG. 7 is an inside view of a pressure valve center section of the present invention taken along line 7—7 of FIG. 2.

The inner side of half-section 28, as seen in FIG. 6, has a generally oblong outer shoulder 52 concentric with generally oblong inner shoulder 54. Oblong slot 56 is formed between outer shoulder 52 and inner shoulder 54 of half-section 28 for receiving connector shoulder 58 of center section 36 (FIG. 2 and FIG. 6). Outer shoulder 52 mates with ledge 60 of center section 28 when half-section 28 and center section 36 are combined (FIG. 5). A figure-eight shaped recess 62 within inner shoulder 54 of half-section 28 (FIG. 6) receives figure-eight shaped double-bore 64 of center section 36 (FIG. 7). Double-bore 64 comprises check valve bore 66 and relief valve bore 68 for receiving check valve 32 and relief valve 34, respectively. Each bore of double-bore 64 has a valve seat 70 adjacent to an orifice 72 for receiving a valve element, for example, mushroom shaped element 74 of check valve 32 and ball 76 of relief valve 34, as best seen in FIG. 5. Each bore also has aperture 78 disposed at an axially opposite end from orifice 72 for allowing fuel flow therethrough. Check valve bore 66 and relief valve bore 68 are oppositely oriented in the axial, or longitudinal, direction so as to control fuel flow in opposite directions, as further discussed below.

Within check valve bore 66, spring 80 biases mushroom shaped element 74 against valve seat 70 on one end, in a manner known to those skilled in the art and suggested by this disclosure, and mates with spring support 82 on the other end (FIG. 5). Likewise within relief valve bore 68, spring 80 similarly biases 76 toward valve seat 70 on one end and rests on spring support 82 on the other end. Alternatively, spring 80 rests on bottom 84 in recess 62 of half-section 28 (FIG. 6) thus eliminating the need for spring support 82 in both check valve 32 and relief valve 34.

It will be apparent to those skilled in the art that half-sections 28 need not be limited to the shape described above, but can be any shape so long as check valve 32 and relief valve 34 are supported in generally parallel alignment to fuel flow through pressure valve 26. Indeed, housing 30 may be of a completely different construction, with differently shaped or asymmetrical half-sections 28, or without half-sections 28. The configuration described above, however, reduces manufacturing costs due to the symmetrical nature of half-sections 28, partially as a result of a decrease in tool design, while also providing a pressure valve 26 which is easily assembled.

Preferably, half-sections 28 are made of a thermoplastic material, such as acetyl, and ultrasonically welded together with center portion 36 therebetween. Check valve 32 and relief valve 34 are assembled within center portion 36, as shown in FIG. 5, before half-sections 28 are welded together. Center section 36 is likewise made of a thermoplastic material, such as acetyl, so as to meld with half-sections 28 during the welding process. Alternatively, half-sections 28 and center section 36 can be made of different materials, such as fuel resistant plastics, nylon or PPS, and attached in other ways known to those skilled in the art, for example with adhesives or overmolding. Once combined, pressure valve 26 is connected to the fuel delivery system of vehicle 10 as shown in FIG. 1. Connection is accomplished by mounting pressure valve 26 to the output side 20a of fuel pump 20 via bracket 86. Bracket 86, preferably a metal tab insert molded into half-sections 28, has screw hole 88 (FIG. 3) for receiving a screw which attaches to fuel pump 20.

In operation at engine start-up, fuel pump 20 pumps fuel from tank 16 to inlet 42 of pressure valve 26. Spring 80 in check valve 32 has a predetermined set point of approximately 1–3 psi, and preferably 2 psi, but in any event is set below the predetermined set point of relief valve 34, which is further discussed below. When fuel pressure from fuel pump 20 exceeds the check valve 32 set point, mushroom shaped element 74 is forced from seat 70 to allow fuel flow through orifice 72. Fuel is thus pumped by fuel pump 20 from tank 16, through pressure valve 26, and to fuel rail 14. During normal operation, pressure within fuel line 18 typically varies between 30 psi and 40 psi as engine demand varies and EEC 24 modifies fuel pump 20 speed to accommodate that demand. Relief valve 34 within pressure valve 26 remains closed during these operating conditions and pressures.

Under certain conditions, such as long deceleration periods on a declining stretch of road, EEC 24 may reduce pump 20 speed to a small amount, or even stop it altogether, since engine 12 demands little fuel. Fuel pressure in fuel line 18 will rise rapidly to an unacceptable level, however, due to the sudden decrease in fuel demand since EEC 24 cannot respond instantly to decrease fuel pump 20 output. When pressure within fuel line 18 rises above the set point of relief valve 34, typically between 30 psi and 45 psi depending on engine application, ball 76 is forced from seat 70 to allow fuel flow through orifice 72. Fuel is thus allowed to flow from fuel line 18, through pressure valve 26, and to output side 20a of fuel pump 20. After pressure within fuel line 18 has been relieved, ball 76 returns to seat 70 under the force of spring 80 which can overcome the oppositely acting force of fuel in fuel line 18. The predetermined set point of relief valve 34 is set substantially above that of check valve 32.

An advantage of pressure valve 26 design is that the set point of relief valve 34 is set relative to nominal fuel pressure in fuel line 18, as opposed to fuel tank 16 pressure, for example, as in the "T" configuration described above. The advantage afforded by the present design is seen in the following scenario. During vehicle 10 operation, fuel pressure within fuel line 18 is typically between 30 psi and 45 psi, depending on engine requirements, and is maintained in that range by varying fuel pump 20 output as described above. However, when pressure within fuel line 18 exceeds a given value, for example 70 psi, which is 30 psi above nominal pump 20 output pressure of 40 psi, relief valve 34 opens to allow fuel therethrough and thus relieve the excess pressure. The set point of relief valve 34 in the above scenario is thus 30 psi.

When vehicle 10 is not operating, however, pressure within fuel line 18 may once again rise due to residual engine heat or high ambient temperatures. Under high ambient temperature conditions, engine heat is conducted away from fuel rail 14 at a slower rate than under milder conditions thus preventing cooling of the fuel within rail 14 and fuel line 18. In a fuel system having a "T" configuration, such pressure would rise until reaching the relief valve setpoint, for example 70 psi. It is thus possible in such a system to have a fuel line pressure of approximately 70 psi at engine start-up. Such a high pressure is undesirable from both an exhaust emissions standpoint and an engine performance standpoint. In the present invention, however, pressure in fuel line 18 does not become excessive after engine 12 has been shut off since the set point of relief valve is set at approximately 30 psi, for example. When engine 12 is started, a near nominal pressure is available in fuel line 18.

Although the preferred embodiment of the present invention has been disclosed, various changes and modifications may be made without departing from the scope of the invention as set forth in the appended claims.

We claim:

1. A fuel delivery system for an automotive internal combustion engine comprising:

(1) a fuel tank;

(2) a fuel pump in fluid communication with said fuel tank and a fuel line on an output side of said pump in fluid communication with a fuel rail connected to said engine; and (3) valve means interposed in said fuel line between said fuel pump and said fuel rail for controlling said fuel flow from said pump to said rail and from said rail to said pump, said valve means comprising:

(a) a valve housing having a pair of half sections, with each of said half sections having a valve receiving portion and a nipple for attachment to a fluid bearing device, said valve housing also having a valve center portion for attachment with said pair of half sections so that said pair of half sections cooperate to form a valve chamber;

(b) a check valve mounted in said valve center portion within said chamber and operable to allow fuel flow from said pump to said fuel line upon said fuel pump delivering a predetermined fuel pressure to said fuel line; and (c) a pressure relief valve mounted in said valve center portion within said chamber parallel to said check valve and operable to allow fuel in said fuel line to flow through said housing to said fuel pump upon fuel pressure in said fuel line exceeding a predetermined relief pressure greater than said predetermined fuel pressure;

(d) and wherein each of said half sections has a recessed, generally figure-eight-shaped valve receiving portion with an orifice through an upper portion thereof in fluid communication with said nipple, said center portion also shaped as a figure-eight with a top section of said figure-eight retaining said check valve and a bottom section of said figure-eight retaining said pressure relief valve, said half sections attached with said nipples aligned so that a fuel flow path is formed along an axis through one of said nipples, through said check valve, and through the other of said nipples.

* * * * *